Aug. 26, 1924.

C. H. HAPGOOD 1,506,000

WEIGHING SCALE

Filed Feb. 7, 1921

Inventor
CLARENCE H HAPGOOD.

By CO Marshall
Attorney

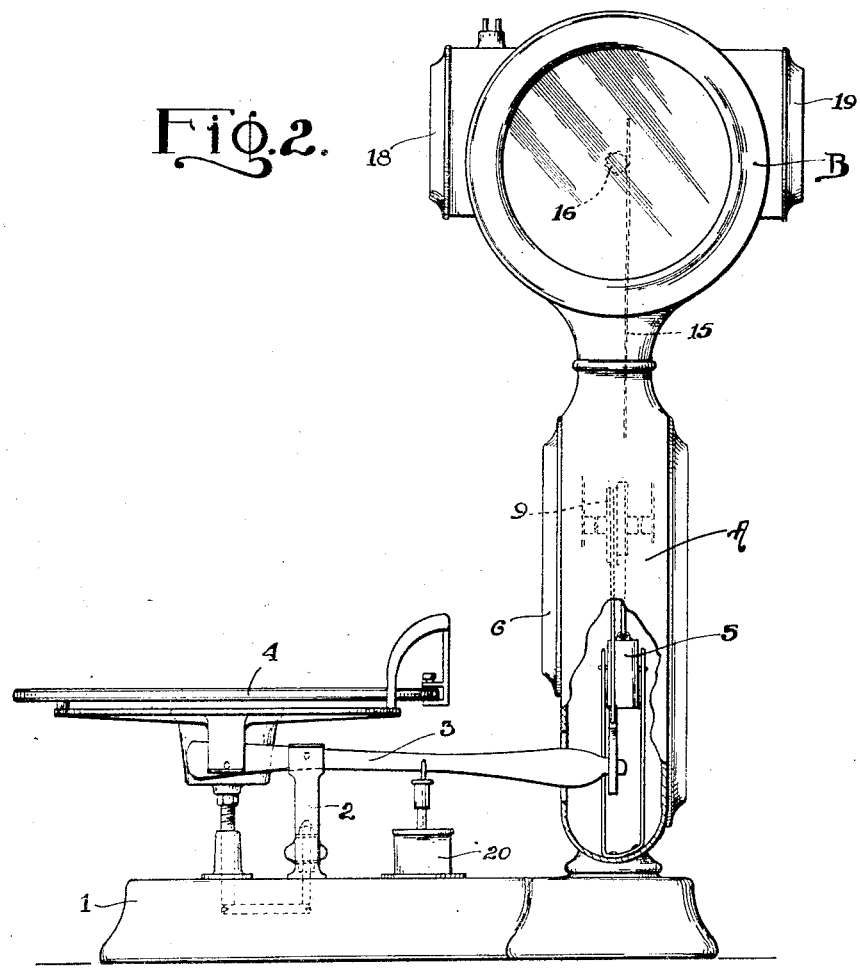

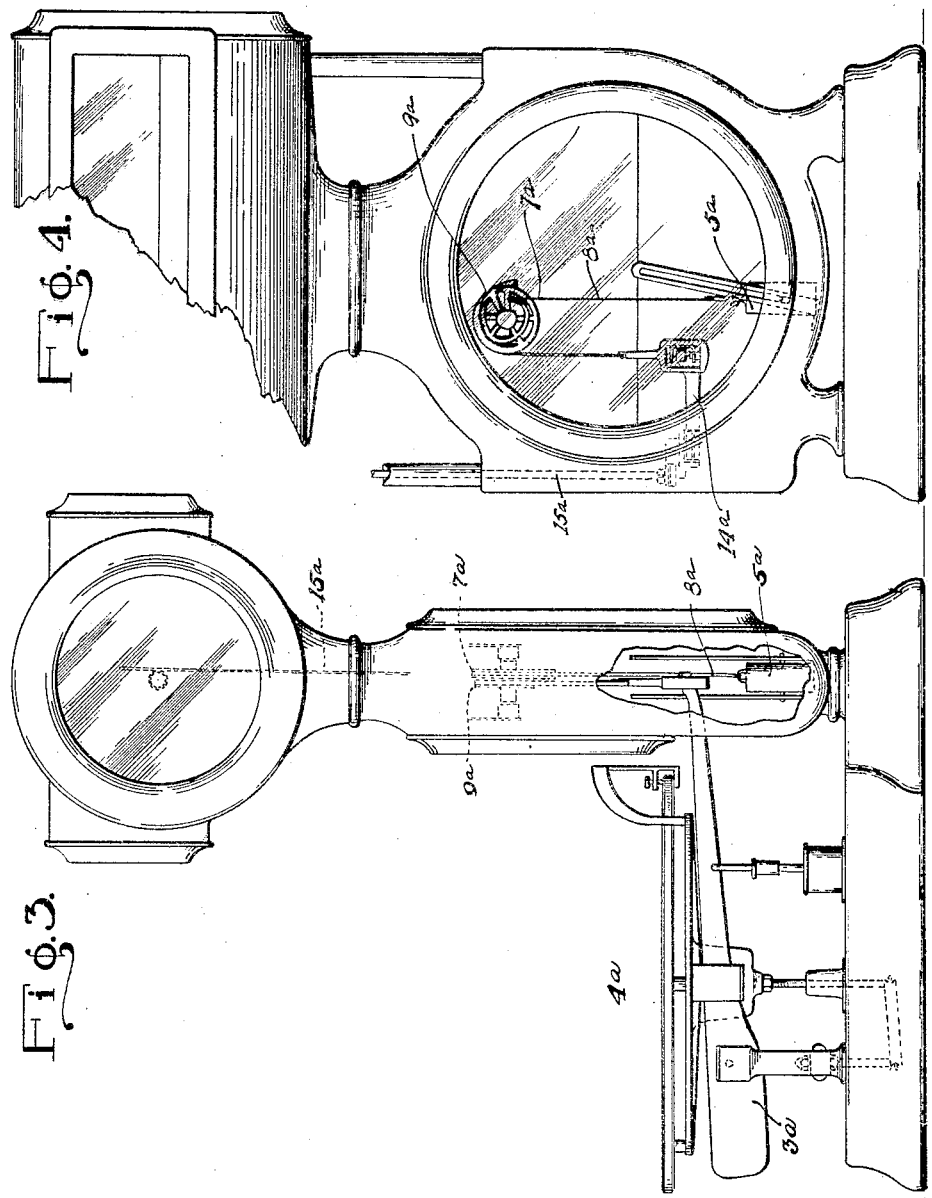

Patented Aug. 26, 1924.

1,506,000

UNITED STATES PATENT OFFICE.

CLARENCE H. HAPGOOD, OF TOLEDO, OHIO, ASSIGNOR TO TOLEDO SCALE COMPANY, OF TOLEDO, OHIO, A CORPORATION OF NEW JERSEY.

WEIGHING SCALE.

Application filed February 7, 1921. Serial No. 442,954.

*To all whom it may concern:*

Be it known that I, CLARENCE H. HAPGOOD, a citizen of the United States, residing at Toledo, in the county of Lucas and State of Ohio, have invented certain new and useful Improvements in Weighing Scales, of which the following is a specification.

This invention relates to weighing scales, and one of its objects is to provide means for connecting a counterpoise to a platform, the connecting means being so arranged that the relative leverage of the counterpoise automatically varies with the load on the platform.

Another object is to provide a scale having a lever carrying the platform on one side of the lever fulcrum, the lever on the other side of the fulcrum being overweighted, and the poise connected to the overweighted portion of the lever so that its leverage is decreased as the overweighted portion is elevated.

Another object is to provide a weighing scale having a lever connected to a rotatable spiral which supports a counterpoise and also to a rack and pinion controlling an indicator.

Other objects and advantages will be apparent from the following description, in which reference is had to the accompanying drawings illustrating preferred embodiments of my invention and in which similar reference numerals designate similar parts throughout the several views.

In the drawings:—

Figure 2 is a side elevation thereof, with parts broken away;

Figure 3 is a side elevation, with parts broken away, of a second form of my device; and Figure 4 is a fragmentary rear elevation of said second form.

Figure 1:
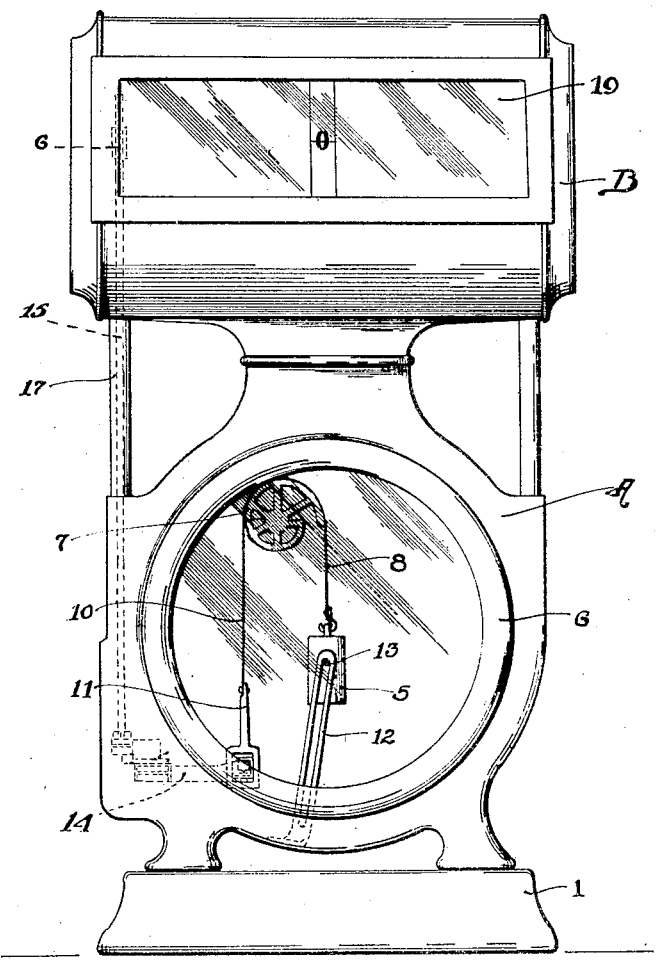
Figure 1 is a rear elevation of a scale embodying my invention.

I have shown my invention as embodied in a scale in which the indicator is in the form of a rotatable cylinder, but it is to be understood that other forms of indicating devices, such, for example, as a rotatable dial or hand, may be substituted for the cylinder without departing from the scope of the invention.

Referring in detail to Figures 1 and 2, the base 1 of the scale supports a base horn or fulcrum bracket 2 upon which the main lever 3 is fulcrumed. The main lever in this form of the invention is of the first order, the rear end being sufficiently heavy to overbalance the platform 4 and also hold a counterpoise 5 in elevated position. The counterpoise 5 is supported within a housing 6 by means of a spiral or fuzee-like member 7 and a flexible metallic ribbon 8. A cylindrical drum 9 is fixed upon the same shaft with the spiral member 7 and is connected to the nose of the lever 3 by means of a ribbon 10 and a stirrup 11. The shaft which carries the spiral 7 and the drum 9 is rotatably mounted in ball bearings supported within the housing 6.

When a load is placed upon the platform 4 the nose of the lever 3 is raised. As the nose of the lever ascends, the drum 9 and spiral member 7 to which the ribbons 10 and 8 are respectively secured are turned by the falling of the counterpoise 5 to a counterbalancing position, the ribbon 10 being wound upon its drum, while the ribbon 8 unwinds from the spiral member. Owing to the fuzee-like action of the device, the radial distance from the axis of the spiral to the point from which the ribbon 8 depends, and hence the lever arm upon which the counterpoise acts, thus becomes progressively less until a condition of balance is reached.

Since the weight moves laterally as well as vertically during the operation of the scale, it is desirable to provide some means for preventing it from swinging. I have therefore fixed a pair of slotted guideways 12 within the housing and provided the poise 5 with pins or lugs 13 that extend into the slots of the guideways but normally remain out of contact with the sides of the slots. When the poise starts to swing, the pins strike against the sides of the slots and the poise is thus quickly brought to rest.

The housing 6 comprises a substantially watch-casing-shaped portion A surmounted by a substantially cylindrical portion B. The watch-casing-shaped portion has windows in its front and rear walls through which the load-offsetting mechanism is visible. The cylindrical portion contains the indicator, which consists of a cylindrical chart mounted to turn on anti-friction bearings.

The lever 3 is provided with a laterally-extending arm 14 to which is pivotally connected a vertically-extending rack 15 meshing with a pinion 16 fixed upon the shaft of the indicator chart, the intermediate portion of the rack being housed in a tube 17 extending between the portions A and B of the housing 6. Since the spiral member 7 and drum 9 which support the heavy counterpoise and the overweighted lever end are connected to the lever independently of its connection with the indicator, the chart may thru its pinion be given a large amount of movement, while the movement of the spiral member 7 and drum 9 which support considerable weight is comparatively slight. Since the chart is very light, it operates without appreciable friction, even though it has a large amount of movement.

The cylindrical portion B of the housing 6 is provided with front and rear windows 18 and 19 through which the chart may be read by both the merchant and the customer.

In order to damp the vibratory movements of the scale mechanism, a dash pot 20 adapted to contain oil or other fluid is mounted upon the base of the scale. The dash pot contains a plunger which works in the oil and is pivotally connected by means of a plunger rod to the main lever 3.

The form of device shown in Figures 3 and 4 differs from that shown in Figures 1 and 2 in that the platform 4ª is supported intermediate the fulcrum and nose of the main lever 3ª. The portion of the lever 3ª which extends beyond the fulcrum is weighted to partially counterbalance the weight of the opposite portion of the lever and the parts supported thereby. The nose of the lever in this form of the device is normally elevated and is connected to a drum 9ª to which is fixed a spiral member 7ª supporting a counterpoise 5ª. When the scale is not under load the counterpoise 5ª is in its lowermost position. As the nose of the lever is forced downwardly, the ribbon 8ª which supports the counterpoise 5ª is wound upon the spiral member 7ª and the leverage of the counterpoise becomes progressively greater as it is elevated until a condition of balance is reached.

The indicating cylinder is operated by a rack 15ª pivotally connected to an arm 14ª of the lever 3ª, as in the form first described, but since the nose of the lever descends instead of ascending, the cylinder in this form, of course, turns in a direction opposite to that of the cylinder in the form first described.

While it will be apparent that the illustrated embodiments of my invention herein disclosed are well calculated to adequately fulfill the objects primarily stated, it is to be understood that the invention is susceptible to variation, modification and change within the spirit and scope of the subjoined claims.

Having described my invention, I claim:

1. In a weighing scale, in combination, a lever, a platform supported thereby, a counterpoise operative connection between said lever and said counterpoise, a spiral member interposed in the connection between said lever and said counterpoise whereby the leverage of said counterpoise changes with the position of said lever, and indicating mechanism operatively connected to said lever.

2. In a weighing scale, in combination, a lever, a platform supported thereby, a counterpoise connected to said lever, a spiral member interposed in the connection between said lever and said counterpoise whereby the leverage of said counterpoise changes with the position of said lever, a rack connected to said lever, a pinion meshing with said rack, and an indicator revoluble with said pinion.

3. In a weighing scale, in combination, a lever, a platform supported thereby, a counterpoise connected to said lever, a spiral member interposed in the connection between said lever and said counterpoise whereby the leverage of said counterpoise changes with the position of said lever, an arm extending from said lever, a rack connected to said arm, a pinion meshing with said rack, and an indicator revoluble with said pinion.

4. In a weighing scale, in combination, a lever, a platform supported thereby, a revoluble member comprising a cylindrical drum having a fuzee-like spiral fixed thereto, a counterpoise, a flexible member suspending said counterpoise from said fuzee-like spiral, a flexible ribbon connecting the nose of said lever with said cylindrical drum, a rack connected to said lever, a pinion meshing with said rack, and an indicator secured to said pinion.

5. In a weighing scale, in combination, a lever, a counterpoise, a platform supported thereby forwardly of the lever fulcrum, the rear end of said lever being overweighted to normally hold said platform and counterpoise in elevated position, a revoluble member comprising a cylindrical drum having a fuzee-like spiral fixed thereto, a flexible member suspending said counterpoise from said fuzee-like spiral, a flexible ribbon connecting the nose of said lever with said cylindrical drum, a rack connected to said lever, a pinion meshing with said rack, and an indicator secured to said pinion.

CLARENCE H. HAPGOOD.

Witnesses:
 FRANCES DOYLE,
 BERNICE TURNEY.